(12) United States Patent
Wassel et al.

(10) Patent No.: US 10,594,130 B2
(45) Date of Patent: Mar. 17, 2020

(54) OVER VOLTAGE DISCONNECT

(71) Applicant: Appalachian Lighting Systems, Inc., Ellwood City, PA (US)

(72) Inventors: James J. Wassel, Fombell, PA (US); John R. Roney, Renfrew, PA (US)

(73) Assignee: Appalachian Lighting Systems, Inc., Ellwood City, PA (US)

( * ) Notice: Subject to any disclaimer, the term of this patent is extended or adjusted under 35 U.S.C. 154(b) by 0 days.

(21) Appl. No.: 15/900,114

(22) Filed: Feb. 20, 2018

(65) Prior Publication Data

US 2018/0175609 A1 Jun. 21, 2018

Related U.S. Application Data

(63) Continuation of application No. 14/667,505, filed on Mar. 24, 2015, now Pat. No. 9,906,013.

(60) Provisional application No. 61/970,085, filed on Mar. 25, 2014.

(51) Int. Cl.
*H02H 3/20* (2006.01)
*H02H 3/06* (2006.01)
*H05B 33/08* (2006.01)

(52) U.S. Cl.
CPC .............. *H02H 3/20* (2013.01); *H02H 3/066* (2013.01); *H05B 33/0887* (2013.01)

(58) Field of Classification Search
CPC ....... H05B 33/0887; H02H 3/20; H02H 3/066
USPC ....................................... 361/91.1
See application file for complete search history.

(56) References Cited

U.S. PATENT DOCUMENTS

| | | | |
|---|---|---|---|
| 4,161,674 A | 7/1979 | Maurer |
| 4,350,935 A | 9/1982 | Spira et al. |
| 4,651,060 A | 3/1987 | Clark |
| 4,888,494 A | 12/1989 | McNair et al. |
| 5,805,394 A | 9/1998 | Glennon |
| 7,035,070 B2 | 4/2006 | Shiner et al. |
| 7,262,945 B2 | 8/2007 | Galang et al. |
| 7,312,588 B1 | 12/2007 | Yu et al. |
| 8,134,820 B1 | 3/2012 | Riccio et al. |
| 8,350,494 B2 | 1/2013 | Snook et al. |
| 8,472,157 B2 | 6/2013 | Yin et al. |
| 2002/0047641 A1 | 4/2002 | Ito et al. |
| 2003/0112568 A1 | 6/2003 | Holt et al. |
| 2003/0146714 A1 | 8/2003 | Buonocunto |
| 2005/0259373 A1 | 11/2005 | Hoopes |

(Continued)

OTHER PUBLICATIONS

International Search Report of related International Patent Application No. PCT/US2015/022449 dated Jul. 7, 2015.

(Continued)

*Primary Examiner* — Kevin J Comber
(74) *Attorney, Agent, or Firm* — Panovia Group LLP

(57) ABSTRACT

A disconnect component coupled between a lighting load and a main power line. The disconnect component includes an input coupled to the main power line and a neutral line input to the disconnect component from the 277 volt circuit and an output coupled to the lighting load. The disconnect component includes a monitor that monitors a voltage on the main power line and a coupling component that couples the main power line to the output. The coupling component is configured to decouple the main power line from the output when the monitor senses a voltage on the main power line is higher than an upper limit voltage and re-couple the main power line to the output when the monitor senses that the voltage on the main power line is below the upper limit voltage.

15 Claims, 3 Drawing Sheets

(56) References Cited

U.S. PATENT DOCUMENTS

| | | |
|---|---|---|
| 2010/0254053 A1 | 10/2010 | Wilson et al. |
| 2011/0216453 A1 | 9/2011 | Haines et al. |
| 2012/0218670 A1 | 8/2012 | Han |
| 2012/0326509 A1 | 12/2012 | McSheffrey |
| 2013/0265683 A1 | 10/2013 | Gueltig |
| 2014/0254050 A1 | 9/2014 | Haines et al. |
| 2015/0282284 A1 | 10/2015 | Wassel et al. |
| 2015/0318683 A1 | 11/2015 | Voelger |
| 2015/0372583 A1 | 12/2015 | Bacaksiz et al. |

OTHER PUBLICATIONS

Texas Instruments, TL43xx Precision Programmable Reference, Datasheet SLVS5430, Aug. 2004, revised Jan. 2015, 76 pages in all.

OVER VOLTAGE DISCONNECT

CROSS-REFERENCE TO RELATED APPLICATION

This application is a continuation of application Ser. No. 14/667,505, entitled "Over Voltage Disconnect" and filed on Mar. 24, 2015, which claims the benefit of U.S. Provisional Application Ser. No. 61/970,085, entitled "Over Voltage Disconnect" and filed on Mar. 25, 2014, the contents of both of which are expressly incorporated by reference herein in their entirety.

BACKGROUND

Field

Aspects of the present invention relate to an over voltage disconnect, e.g., for use with 277 volt (V) lighting systems.

Background of the Technology

A 277 V lighting system includes a shared circuit, one leg of the shared circuit being 277 V. In 277 V lighting systems having shared neutrals, there is a possibility of an over voltage condition, e.g., if that neutral connection is lost. In an over voltage condition, the voltage rises above the intended 277 V. The severity of the over voltage depends on the loading of the other phases in the system. Whereas older iron core "transformer" type ballasts and bulbs could handle or "absorb" the overage and remain functional afterward, newer lighting systems can be damaged by over voltages. Among other things, an over voltage can be destructive to newer switching type power supplies, ballasts, Light Emitting Diode (LED) drivers, etc. Newer, electronic based and/or switching type power supplies have a specific range of voltage that they are designed to accept. Voltages beyond that range will most likely result in some sort of failure that will render the corresponding lighting system useless.

Thus, in lighting systems having electronic based and/or switching type components such as LEDs or other similar solid state light emitters, a solution is needed to protect the lighting system from such over voltages.

SUMMARY OF THE INVENTION

Aspects of the present invention overcome the above identified problems, as well as others, by providing a disconnect component that protects the electronic based and/or switching type components of a lighting system from over voltages.

Additional advantages and novel features in accordance with aspects of the present invention will be set forth in part in the description that follows, and in part will become more apparent to those skilled in the art upon examination of the following or upon learning by practice thereof.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects present herein include a disconnect component and a lighting system incorporating the disconnect component.

A 277 V lighting system includes a shared circuit, one leg of the shared, three phase circuit being 277 V, and a second being a neutral. However, when a neutral connection is lost, the voltage on the other phases rises. Thus, there is a possibility that lighting systems on such a 277 V circuit may experience a voltage higher than the intended 277 V. Older lighting systems included an iron core ballast that was able to handle the additional voltage. However, newer lighting systems, such as LED lighting systems and other solid state emitters, include electronic based switching components that can be damaged by the additional voltage.

In order to avoid damage to components of a 277 V lighting system e.g., a power supply, a ballast, LED drivers, etc., a disconnect component is provided that continuously monitors a line for an over voltage condition. When the voltage in the line rises above an acceptable level, the disconnect component disconnects the load from the line, thereby preventing it from experiencing the over voltage condition. The load may include, e.g., the power supply and ballast for the lighting system. The disconnect component disconnects the load within the time period of the increasing voltage cycle, in order to protect the susceptible components of the lighting system from damage that could be caused if the assembly did experience the over voltage. Even during the disconnected state, the disconnect component continues to monitor the line. When the voltage on the line returns to an acceptable level, the disconnect component automatically reconnects the line voltage to the lighting system.

Figure 1:
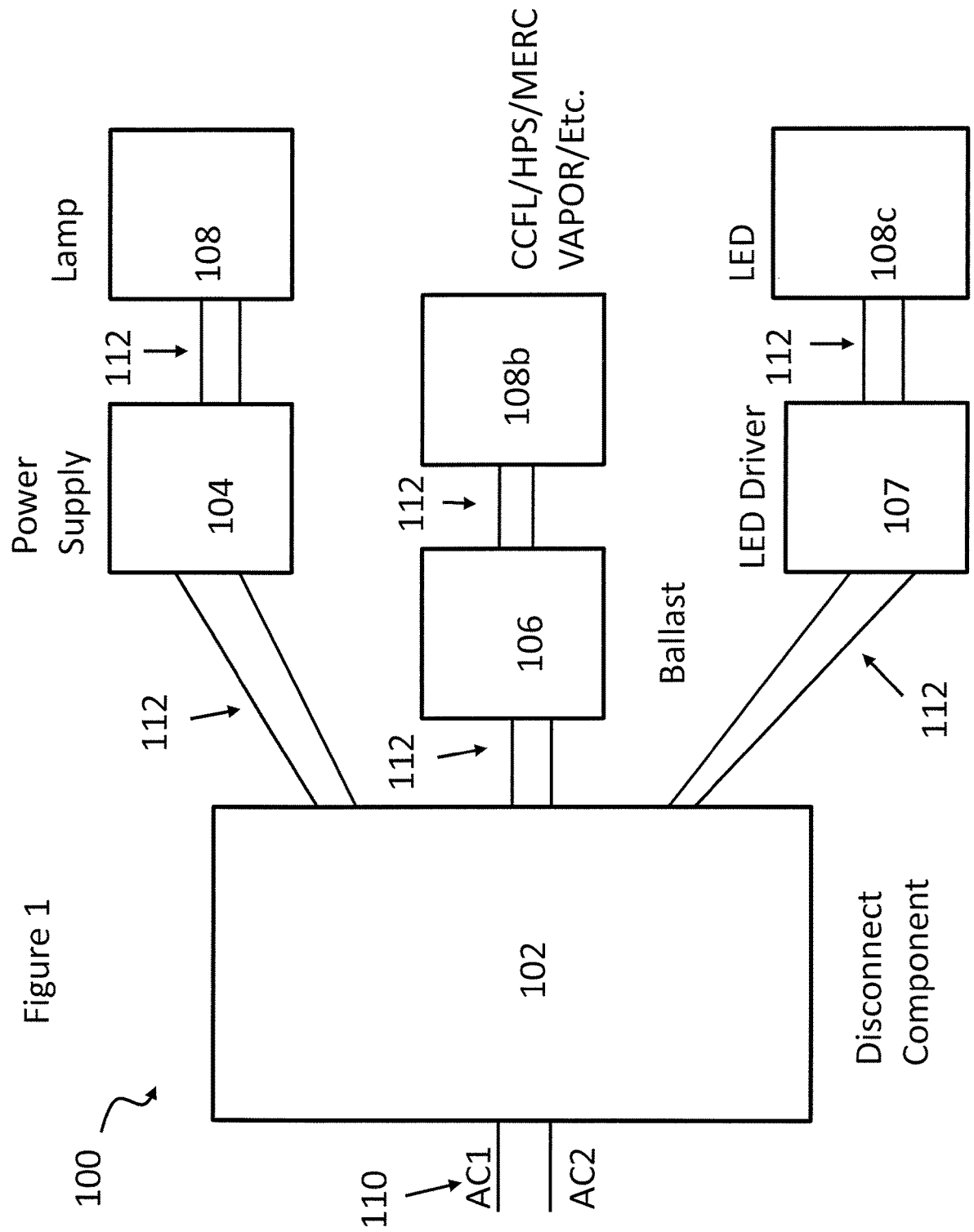
FIG. 1 shows an example lighting system in accordance with aspects of the present invention.

FIG. 1. Illustrates an example diagram of a lighting system 100 having a disconnect component 102. Lighting system 100 is coupled to a main power line 110, which may be, e.g., a 277 V line. The lighting system comprises a lighting load coupled to the main power line. The lighting system may comprise any combination of, e.g., a power supply 104, a ballast 106, a driver 107 and a lamp 108a-c. These lighting system components are coupled to a line 112 output from the disconnect component 102. Lamp 108 may comprise any lighting fixture having an electronic switching type power supply, driver, and/or ballast. Among others, such a lighting fixture may comprise an LED or other solid state emitter, a fluorescent light, and/or high pressure sodium light. For example, an LED 108c is shown in connection with an LED driver, and a fluorescent or high pressure lighting fixture 108b is shown in connection with an electronic ballast 106. The combinations of power supply 104 and lamp 108; ballast 106 and lighting fixture 108b, and driver 107 and LED 108c, are merely examples, and any combination of power supply, ballast, and driver may be coupled to any lamp 108. For example, in one aspect, both a power supply 104 and an LED driver 107 may be coupled between LED 108c and disconnect component 102. Additionally, although multiple lighting fixtures 108, 108b and 108c are shown coupled to a single disconnect component 102, a disconnect component may be provided for each lamp or lighting fixture and/or for a subset of lighting fixtures. Ballast 106 may be, e.g., an electronic ballast. Disconnect component 102 is coupled between the main power line 110 and the components of the lighting system that are susceptible to damage from increased voltages. The disconnect component 102 continuously monitors the voltage on the main power line 110 and operates to disconnect the load components of the lighting system that are susceptible to damage from the main power line when the voltage on the power line rises above an acceptable level. When the voltage returns to a level that is within an acceptable range, the disconnect component reestablishes the connection.

Figure 2:
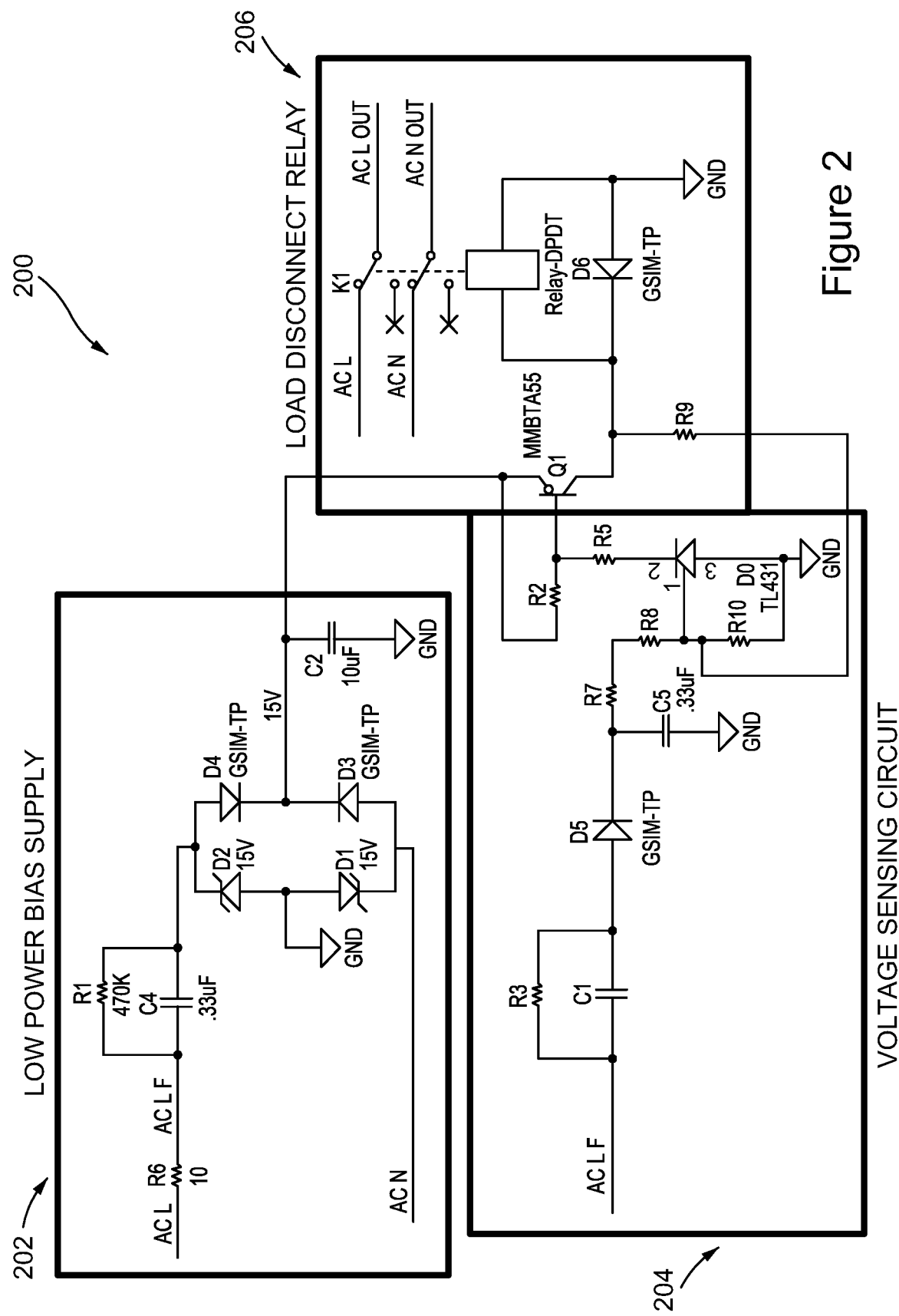
FIG. 2 shows an example disconnect component in accordance with aspects of the present invention.

FIG. 2 illustrates example features of a disconnect component 200 in accordance with aspects of the present invention. Aspects illustrated in disconnect component 200 in FIG. 2 may be included in disconnect component 102 shown in FIG. 1.

Aspects of the disconnect component may include, e.g., a double pole relay, a low power line rectifier circuit, a low power precision shunt reference and a switching device to control the relay coil. As described supra, the disconnect device 206 may comprise a TRIAC silicon based switch such as a triode for alternating current (TRIAC) rather than a relay as a switching element to disconnect the load from the line. When a voltage on the power line increases beyond an acceptable level, the shunt reference device may be used as an open loop operational amplifier. Feedback resistor element R9 may be included, e.g., in the open loop operational amplifier, in order to prevent on/off oscillations when approaching the transition threshold.

When a level above the preset acceptable level is sensed, the component may drive a switching device (bipolar junction transistor (BJT)/field-effect transistor (FET)) to activate a relay. As long as the voltage remains higher than the set point, the relay remains engaged and disconnects or decouples the main power line/neutral connections from the load, e.g., the power supply, ballast, and light emitter of the lighting system. Aspects may also include the use of a TRIAC in place of the relay.

FIG. 2 illustrates the disconnect component 200 comprising a low power bias supply 202, a voltage sensing circuit 204, and a load disconnect relay 206. The disconnect component 200 may be configured, e.g., as a box component that can be coupled in series with the lighting load.

The low power bias supply 202 may be configured to supply power to the load disconnect relay 206 and the voltage sensing circuit 204. For example, the lower power capacitor coupled bias supply may generate approximately 15 V DC to drive the disconnect device and the detection circuitry. The low power bias supply 202 comprises an input coupled to the main power line AC_L and an input coupled to the neutral line AC_N of the 277 circuit. The low power bias supply 202 also includes a capacitor coupled to a rectifier to generate 15V, which is output to the voltage sensing circuit 204 and the load disconnect relay 206.

The voltage sensing circuit 204 may be configured to continuously sense or monitor a voltage received on the main power line AC_L. This circuit 204 receives the main power line AC_L at an input. It comprises a circuit (e.g., TL431) that generates a reference voltage, e.g., the upper limit voltage. The voltage of the main power line AC_L is sampled by the voltage sensing circuit and compared to the reference voltage. If the sampled voltage is above the reference voltage, the circuit changes states, causing an output to the load disconnect relay that opens the relay. For example, a TL431 circuit may change states and drive circuitry that causes the relay contacts to open. Once the relay is driven, some voltage from the drive circuit may be fed back to the sense circuit to ensure the relay stays switched until a new lower falling threshold is reached. This provides hysteresis and prevents oscillations in the TL431 circuit.

The load disconnect relay 206 may be configured to disconnect or decouple the lighting load from the main power line when a voltage on the main power line rises above an acceptable level. The load disconnect relay 206 may comprise a coupling component, e.g., a relay that couples the main power line, e.g., AC_L and the neutral line AC_N to output lines, e.g., AC_L_OUT and AC_N_OUT outputting power from the disconnect component 200 to the other lighting system components, e.g., 104, 106, 108. The relay may comprise at least one switch K1, and may comprise, e.g., a double pole double throw (DPDT). Each illustrated switch may comprise, e.g., a bipolar junction transistor (BJT) and/or field-effect transistor (FET). As described supra, the disconnect device 206 may comprise a switch comprised of a silicon based type switching element, e.g. a TRIAC or other device, to disconnect the load. For example, a bipolar or FET may only "drive" the relay rather than directly disconnect the line.

Figure 3:
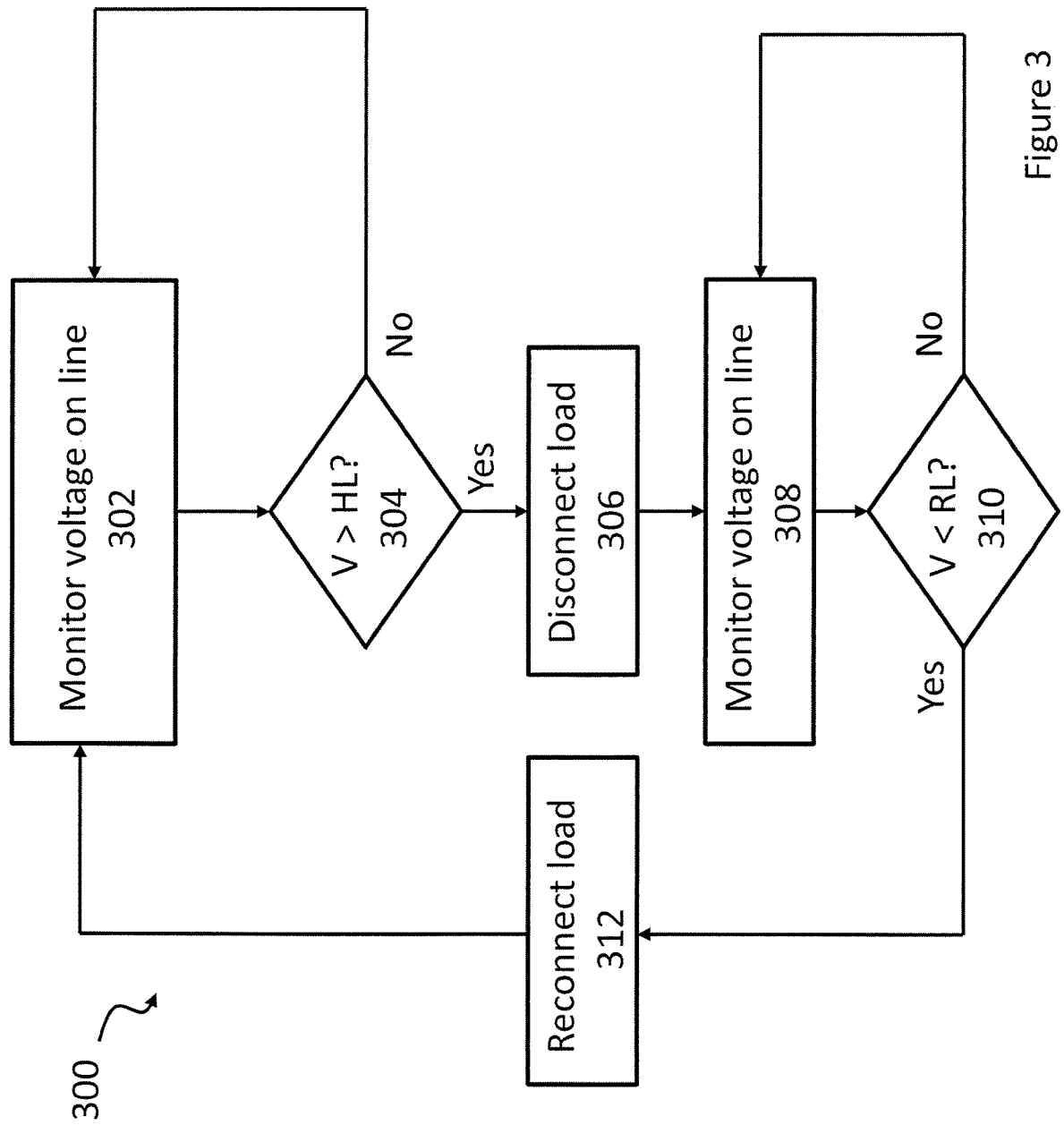
FIG. 3 shows a flow chart for a method of protecting a lighting system from over voltages in accordance with aspects of the present invention.

FIG. 3 illustrates a method 300 of protecting a lighting system from an over voltage condition. At 302, the voltage on the line is continuously monitored. At 304, a determination is made as to whether the voltage measured on the line is greater than a preselected high level (HL). This monitoring/determination may be performed, e.g., by voltage sensing circuit 204 of FIG. 2.

The acceptable upper limit for the voltage may be selected based on the characteristics of the lighting system. For certain components, a voltage slightly above 277 V may be acceptable, e.g., up to 305 V, but beyond this level, damage may occur. For example, an over voltage may be considered 10% beyond the nominal voltage of 277 V, e.g., 305 V. Any voltage that exceeds 305 V may be considered an over voltage situation. The upper limit may be selected, e.g., based on the level at which the most susceptible component might be damaged, even though other components are capable of handling a higher voltage.

For example, the upper limit may be selectable based on the voltages of the WYE system used. The WYE system is, e.g., a transformer type where the shared neutral comes from. A lower voltage such as a 120/208 system might not incur problems because typical supplies (electronic drivers/ballasts, etc.) are rated to 264Vin, or 277 which may adjust the maximum to 305.

Although examples are given for a 277 V system, aspects may be applied to other "higher voltage" lighting systems involving a similar circuit by adjusting the switching threshold voltage to an appropriate level for the particular application.

When the voltage is not greater than the upper limit, the voltage continues to be monitored. When the voltage is determined to be beyond an acceptable level, the lighting load is disconnected or decoupled from the power line at 306. This can be performed, e.g., by load disconnect relay 206 shown in FIG. 2. As illustrated in FIG. 2, load disconnect relay 206 may comprise at least one switch, e.g., K1, that couples the received, main power line, e.g., AC_L and AC_N to the lines that output power from the power disconnect component 200, e.g., AC_L_OUT and AC_N_OUT. When an over voltage condition is sensed, the switch may open thereby decoupling the output lines from the received power line.

When the load is disconnected, the voltage continues to be monitored at 308, e.g., by voltage sensing circuit 204 shown in FIG. 2. At 310, a determination is made as to whether the monitored voltage continues to be above an acceptable limit. As long as the voltage remains high, the load remains disconnected, and the voltage is continuously monitored. When the voltage is determined to have returned to an acceptable level, e.g. below the reconnect limit RL, the load is reconnected or recoupled at 312, and the voltage continues to be monitored for another over voltage condition. This reconnect voltage may be the same as HL. Alternatively, the reconnect voltage may be set to be a percentage below the overvoltage level that triggered the disconnect. By setting the acceptable level to reconnect the LED light a percentage below the over voltage limit that triggered the disconnect prevents flickering of the light that may occur if a single limit were to trigger both disconnect and reconnect The load may be recoupled, e.g., by closing switch K1.

The over voltage disconnect may be used in connection with light fixtures having power supplies and control circuitry, such as those described in U.S. application Ser. No. 13/462,674, titled "LED LAMP APPARATUS AND METHOD OF MAKING AN LED LAMP APPARATUS", filed on May 2, 2012, Published as Publication No. 2012/0307483, which is a Continuation of U.S. application Ser. No. 12/243,316, filed Oct. 1, 2008, issued as U.S. Pat. No. 8,186,855, which claims priority to U.S. Provisional Patent Appl. No. 61/071,828 filed May 20, 2008 and U.S. Provisional Patent Appl. No. 60/960,473 filed Oct. 1, 2007; in U.S. patent application Ser. No. 13/588,926, titled, "Lighting Device Monitor and Communication Apparatus," filed on Aug. 17, 2012, which claims priority to Provisional Application No. 61/525,448 titled "Lighting Device Communication Apparatus" filed Aug. 19, 2011, and Provisional Application No. 61/542,556, titled Lighting Device Including Power Supply and Surge Protection Monitoring, filed Oct. 3, 2011; in U.S. application Ser. No. 13/692,402 titled "LIGHTING FIXTURE" filed on Dec. 3, 2013, Published as Publication No. 2013/0155675, which claims priority to U.S. application Ser. No. 12/341,798 filed on Dec. 22, 2008, now U.S. Pat. No. 8,322,881, which claims priority to Provisional Application No. 61/015,713 filed on Dec. 21, 2007 and Provisional Application No. 61/094,558 filed on Sep. 5, 2008; and in U.S. Provisional Application No. 61/936,586 titled "LED Light Emitting Apparatus Having Both Reflected and Diffused Subassemblies," filed on Feb. 6, 2014, the entire contents of each of which are hereby expressly incorporated by reference herein.

Although aspects are described in connection with a 277 V lighting system, the aspects presented herein could be adapted to other voltages, e.g., a range between 90 V-264 V. Additionally, the acceptable range cut off may be set to 277 V, 305 V, etc. based on the tolerance of the components of the lighting system that are being protected by the disconnect component.

Example aspects of the present invention have now been described in accordance with the above advantages. It will be appreciated that these examples are merely illustrative thereof. Many variations and modifications will be apparent to those skilled in the art.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A disconnect component for a 277 volt circuit, the disconnect component comprising:
an input receiving a main power line and a neutral line input to the disconnect component from the 277 volt circuit;
an output including a main output line and a neutral line output, wherein the main output line and the neutral line output are configured to provide a voltage to a load;
a voltage sensing circuit configured to monitor a voltage on the main power line and to operate in a first state when the monitored voltage on the main power line is below a first reference voltage and to operate in a second state when the monitored voltage on the main power line is above a second reference voltage, wherein the first and second reference voltages differ by a predetermined percentage; and
a coupling component configured to:
couple the main power line to the main output line and the neutral line input to the neutral line output;
decouple the main power line from the main output line and the neutral line input from the neutral line output when the voltage sensing circuit changes operation from the first state to the second state; and
re-couple the main power line to the main output line and the neutral line input to the neutral line output when the voltage sensing circuit changes operation from the second state to the first state.

2. The disconnect component of claim 1, further comprising:
a low power bias supply that includes the input; and
a load disconnect relay that includes the coupling component.

3. The disconnect component of claim 1, wherein the coupling component comprises at least one switch.

4. The disconnect component of claim 1, wherein the load comprises a lighting system having components susceptible to damage at a voltage beyond the upper limit voltage.

5. The disconnect component of claim 4, wherein the lighting system components comprise at least one selected from a group consisting of a power supply, a ballast, and a light emitter.

6. The disconnect component of claim 5, wherein the light emitter comprises at least one of at least one of a light emitting diode, a fluorescent light, and a high pressure sodium light.

7. A 277 volt lighting system comprising:
a lighting load; and
a disconnect component coupled between the lighting load and a main power line, the disconnect component including:
an input coupled to the main power line and a neutral line input to the disconnect component from the 277 volt circuit;
an output coupled to the lighting load;
a monitor that monitors a voltage on the main power line, the voltage having a voltage cycle; and
a coupling component that couples the main power line to the output, wherein the coupling component is configured to:
detect as an over-voltage cycle that the voltage on the main power line is higher than an upper limit voltage;
within a time period of the over-voltage cycle, decouple the main power line from the output when the monitor senses that the voltage on the main power line is higher than the upper limit voltage; and
re-couple the main power line to the output when the monitor senses that the voltage on the main power line is below the upper limit voltage.

8. The lighting system of claim 7, wherein the lighting load comprises at least one selected from a group consisting of a power supply, a ballast, and a light emitter.

9. The lighting system of claim 8, wherein the light emitter comprises at least one of a light emitting diode, a fluorescent light, and a high pressure sodium light.

10. The lighting system of claim 7, wherein the disconnect component further comprises:
a low power bias supply that includes the input; and
a switching element that includes the coupling component.

11. The lighting system of claim 10, wherein the switching element comprises at least one of a load disconnect relay and a solid state switching device.

12. The lighting system of claim 7, wherein the monitor comprises a voltage sensing circuit.

13. The lighting system of claim 7, wherein the coupling component comprises at least one switch.

14. A method of protecting a lighting system on a 277 V circuit, the method comprising:
monitoring a voltage on a main power line;
determining whether the voltage is higher than a high voltage limit;
when the voltage is higher than a high voltage limit, decoupling the main power line from components of the lighting system that are susceptible to damage by the voltage and continuing to monitor the voltage on the main power line;
determining whether the voltage on the main power line returns to a level a predetermined percentage below the high voltage limit; and
when the voltage on the main power line returns to the level the predetermined percentage below the high voltage limit, re-coupling the main power line to the components of the lighting system.

15. The method of claim 14, wherein decoupling the main power line from the components comprises:
opening a switch provided between the main power line and the components.

\* \* \* \* \*